(12) United States Patent
Cichetti, Sr.

(10) Patent No.: US 6,828,700 B2
(45) Date of Patent: Dec. 7, 2004

(54) APPARATUS AND METHOD FOR COOLING AN ELECTRIC MOTOR

(75) Inventor: Michael D. Cichetti, Sr., Springfield, PA (US)

(73) Assignee: Lasko Holdings, Inc., Wilmington, DE (US)

(*) Notice: Subject to any disclaimer, the term of this patent is extended or adjusted under 35 U.S.C. 154(b) by 21 days.

(21) Appl. No.: 10/234,530

(22) Filed: Sep. 3, 2002

(65) Prior Publication Data

US 2004/0041475 A1 Mar. 4, 2004

(51) Int. Cl.[7] .................................................. H02K 9/00
(52) U.S. Cl. ......................................... 310/52; 310/58
(58) Field of Search ............................ 310/52, 59, 58; 313/58

(56) References Cited

U.S. PATENT DOCUMENTS

| 3,422,339 A | 1/1969 | Baker |
| 3,643,119 A | 2/1972 | Lukens |
| 3,873,862 A * | 3/1975 | Butler .......................... 310/50 |
| 5,734,217 A * | 3/1998 | Morinigo .................... 310/166 |

FOREIGN PATENT DOCUMENTS

| DE | 540 080 C | 12/1931 |
| DE | 195 15 252 A | 11/1996 |
| EP | 0 374 739 | 6/1990 |
| EP | 0 948 116 A | 10/1999 |

OTHER PUBLICATIONS

International Search Report PCT/US03/26887, dated Dec. 19, 2003.

* cited by examiner

Primary Examiner—Nicholas Ponomarenko
Assistant Examiner—Iraj A. Mohandesi
(74) Attorney, Agent, or Firm—RatnerPrestia

(57) ABSTRACT

An improved electric motor cooling construction where the motor stator is contained within the motor housing. The motor covers and motor housing are designed to provide direct increased airflow to the motor stator, and coil windings to provide better airflow through the motor resulting in improved cooling.

19 Claims, 9 Drawing Sheets

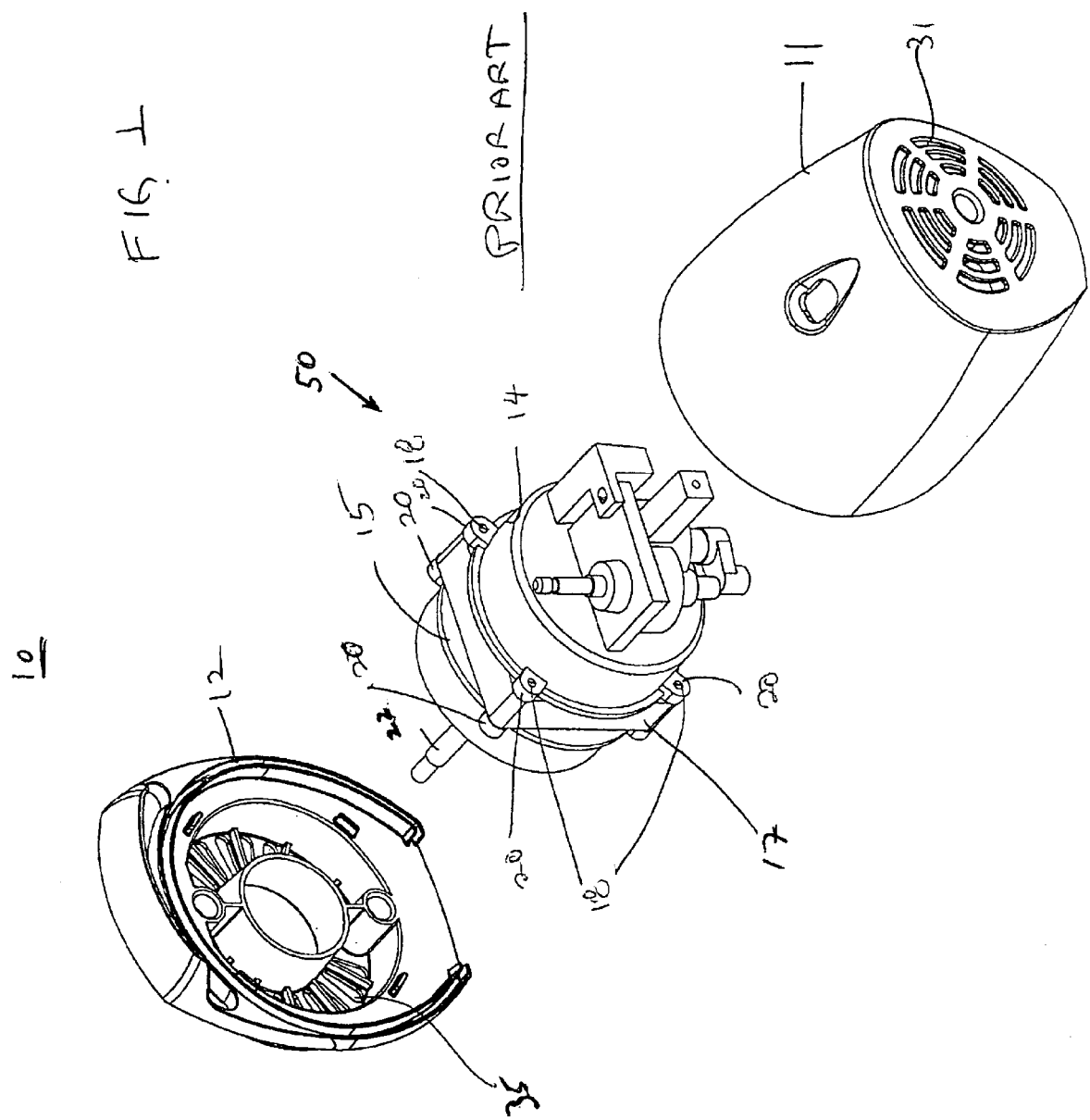

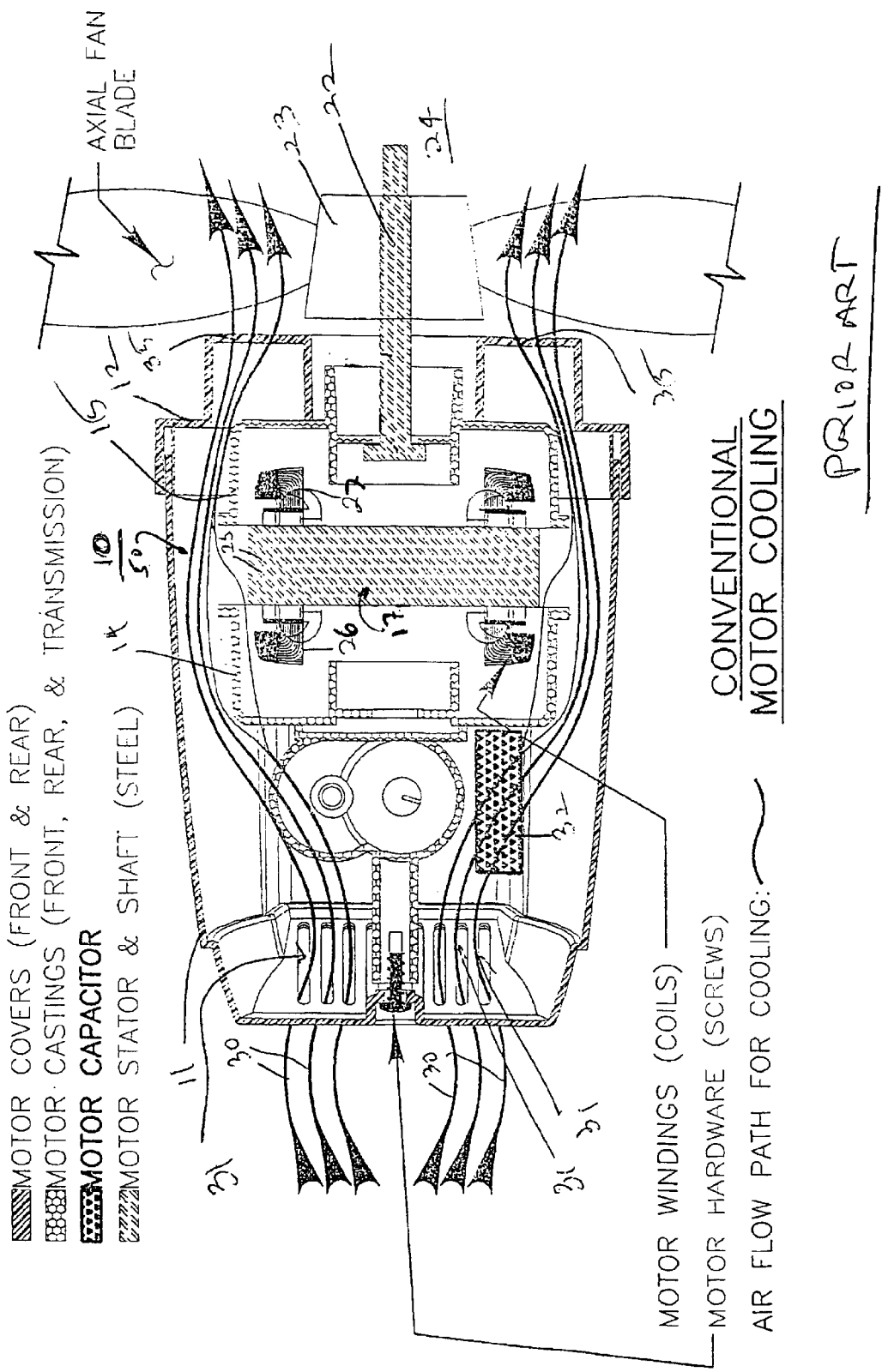

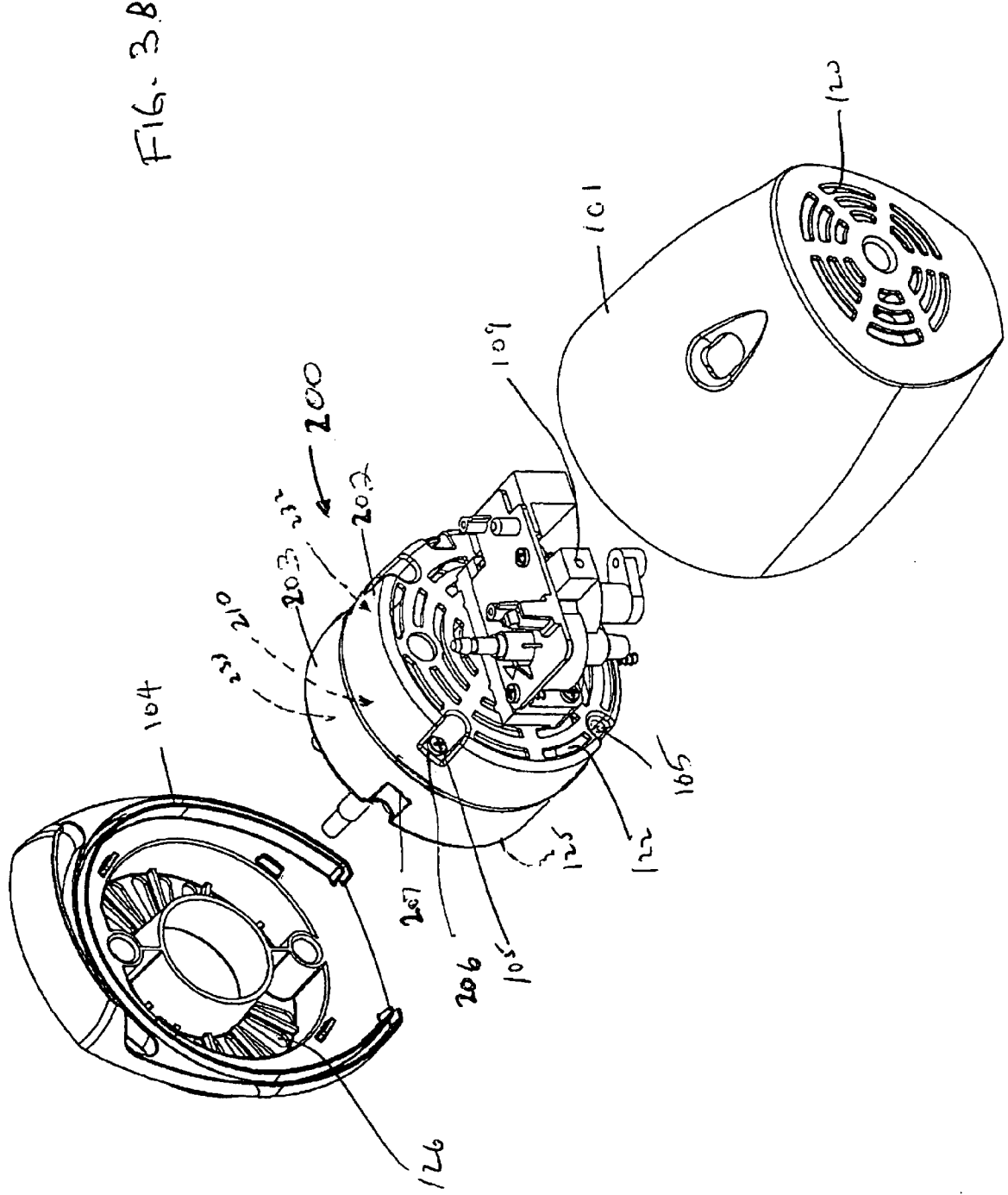

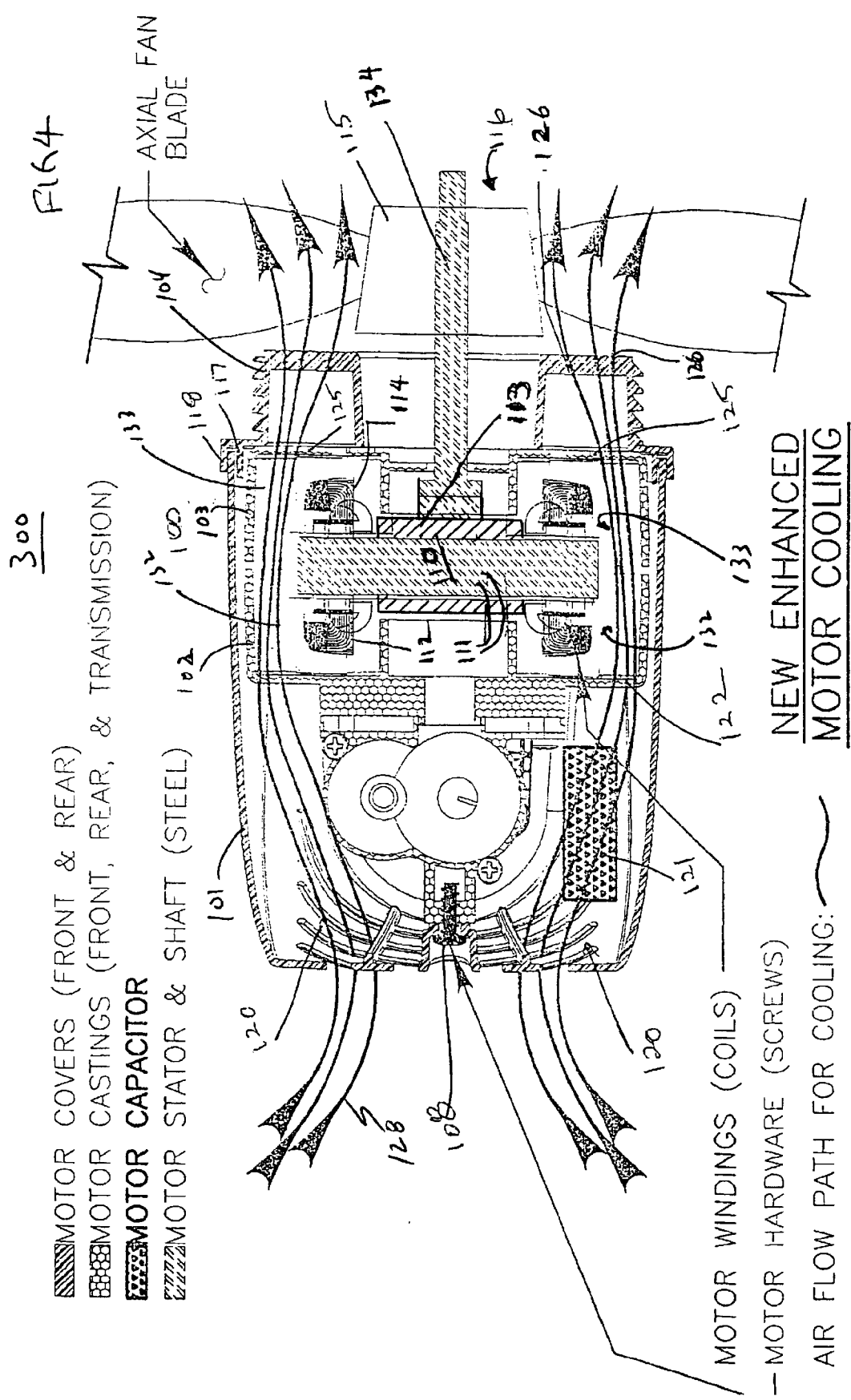

FAN TEST DATA - MOTOR/FAN PERFORMANCE

| PERFORMANCE LOADED ||||||||||||
|---|---|---|---|---|---|---|---|---|---|---|---|
| SPEED | | RPM | AMPS | WATTS in | WATTS out | %eff | TEMP Δ °C | VOLTAGE start | VOLTAGE cap | TORQUE in/oz start | TORQUE in/oz run | TORQUE in/oz stall | CFM |
| TEST 1 | high | 1118 | 1.030 | 114.1 | | | 70.58 | | | | | | |
| TEST 1 | med | | | | | | | | | | | | |
| TEST 1 | low | 771 | 0.606 | 72.1 | | | 64.03 | | | | | | |
| TEST 2 | high | | | | | | | | | | | | |
| TEST 2 | med | | | | | | | | | | | | |
| TEST 2 | low | | | | | | | | | | | | |

| TEMPERATURE RISE RESISTANCE ||||||||||||
|---|---|---|---|---|---|---|---|---|---|---|---|
| Blade: 18";5P;SLA;NINJA | | | | Tare: 0.400 | | Blade: | | | | Tare: | |
| SPEED | | RO Ω | TO °C | RX Ω | TX °C | TEMP Δ°C | SPEED | RO Ω | TO °C | RX Ω | TX °C | TEMP Δ°C |
| TEST 1 | high | 39.77 | 21.9 | 50.53 | 21.4 | 70.58 | TEST 2 high | | | | | |
| TEST 1 | med | 66.05 | 21.9 | | | | TEST 2 med | | | | | |
| TEST 1 | low | 87.86 | 21.9 | 109.60 | 21.6 | 64.03 | TEST 2 low | | | | | |

| PERFORMANCE IDLE |||||| LOCKED ROTOR |||||
|---|---|---|---|---|---|---|---|---|---|---|
| SPEED | AMPS | WATTS in | V CAP | TEMP Δ °C | TIME (min) trip | TIME (min) reset | AMPS | WATTS in | TEMP Σ°C TC | TEMP Δ °C | TIME (min) trip | TIME (min) reset |
| high | | | | | | | | | | | | |
| med | | | | | | | | | | | | |
| low | | | | | | | | | | | | |

| THERMOCOUPLE (LOC) | Σ °C | Δ °C | THERMOCOUPLE (LOC) | Σ °C | Δ °C |
|---|---|---|---|---|---|
| TOP FRONT COIL (27) | 96.90 | 75.50 | | | |
| TOP REAR COIL (26) | 85.88 | 64.28 | | | |

FIG. 5

FAN TEST DATA - MOTOR/FAN PERFORMANCE

| PERFORMANCE LOADED ||||||||||||
|---|---|---|---|---|---|---|---|---|---|---|---|
| SPEED | | RPM | AMPS | WATTS in | WATTS out | %eff | TEMP Δ °C | VOLTAGE start | VOLTAGE cap | TORQUE in/oz start | TORQUE in/oz run | TORQUE in/oz stall | CFM |
| TEST 1 | high | 1140 | 1.066 | 117.1 | | | 46.14 | | | | | | |
| TEST 1 | med | | | | | | | | | | | | |
| TEST 1 | low | | | | | | | | | | | | |
| TEST 2 | high | | | | | | | | | | | | |
| TEST 2 | med | | | | | | | | | | | | |
| TEST 2 | low | | | | | | | | | | | | |

| TEMPERATURE RISE RESISTANCE |||||||||||||
|---|---|---|---|---|---|---|---|---|---|---|---|
| Blade: 18";5P;SLA;NINJA ||||| Tare: 0.400 | Blade: |||| Tare: ||
| SPEED | | RO Ω | TO °C | RX Ω | TX °C | TEMP Δ°C | SPEED | | RO Ω | TO °C | RX Ω | TX °C | TEMP Δ°C |
| TEST 1 | high | 39.38 | 21.9 | 46.41 | 22.0 | 46.14 | TEST 2 | high | | | | | |
| TEST 1 | med | | 21.9 | | | | TEST 2 | med | | | | | |
| TEST 1 | low | | 21.9 | | | | TEST 2 | low | | | | | |

| PERFORMANCE IDLE ||||| LOCKED ROTOR |||||
|---|---|---|---|---|---|---|---|---|---|---|
| SPEED | AMPS | WATTS in | V CAP | TEMP Δ °C | TIME (min) trip | TIME (min) reset | AMPS | WATTS in | TEMP Σ°C TC | TEMP Δ °C | TIME (min) trip | TIME (min) reset |
| high | | | | | | | | | | | | |
| med | | | | | | | | | | | | |
| low | | | | | | | | | | | | |

| THERMOCOUPLE (LOC) | Σ °C | Δ °C | THERMOCOUPLE (LOC) | Σ °C | Δ °C |
|---|---|---|---|---|---|
| TOP FRONT COIL (114) | 67.80 | 44.80 | | | |
| TOP REAR COIL (112) | 67.80 | 44.80 | | | |

FIG. 6

APPARATUS AND METHOD FOR COOLING AN ELECTRIC MOTOR

FIELD OF THE INVENTION

This invention relates to cooling of electric motors. More specifically, the present invention relates to an apparatus and method to improve the cooling of electric motors by creating a more even airflow over the motor coil windings and stator laminations.

BACKGROUND OF THE INVENTION

The majority of all commercial and industrial electric fans have an electric motor. These motors generate heat from the motor windings. This heat, when excessive, can degrade overall performance and longevity of the motor. Typically fan designers try to use the "suction" on the rear of the blade and blade hub to help pull the air through the rear of the motor towards the front. This airflow is important in providing cooling for the motor windings, however, there are many structurally necessary elements that are part of the motors which limit the amount of airflow that can help cool the motor.

One of these structurally necessary elements is the motor housing. The motor housing is used to mount the bearings, which support the shaft for rotation. The housing also protects the windings from damage after the motor is assembled, and also acts as an enclosure. The housing has openings, the size of which is mandated by standards organizations such as Underwriters Laboratories. If the openings in the housings exceed a certain mandated size, special cover materials or additional enclosures are required. Motors housings can be cast aluminum, zinc or stamped metal. Motor housings are in contact with the stator, and, in the prior art, closely surround the windings/coils, which leaves little to no area for "air flow" through the motor.

A second structural element, which limits airflow through the motor, consists of the stator and rotor. The stator consists of a stack of steel laminations which have copper magnet wire wound on them. Conventionally, the steel is normally sandwiched between the front and the rear housings.

Looking through the rear housing, the wire and stator laminations block the airflow through the motor. The area of opening for air movement through the stator is generally quite small even in relationship to the mandated holes in the motor housings and the motor covers. The prior art housings are so tight against the outside of the laminations that they generally do not allow adequate airflow through the housings and by the coils. The two motor housings typically have a gap where the stator sits, which also allows some of the air entering the rear motor housing to escape, thereby completely bypassing the front coil.

A third structural element, which effects airflow through the motor, is the outside motor cover. For safety purposes most electric motors are surrounded by "motor covers." Common materials for motor covers are metal and plastic. These covers are usually aesthetic and cover any electrical materials and/or hot motor surfaces. These, motor covers may additionally impede airflow through the motor. Motor covers have vent structures which are usually located at the rear and the front of the motor. Venting provides an airflow path that will enter the "rear motor cover" and flow mostly around the outside of the motor housing drawing heat from the housings, which in turn draws heat from the stator/ windings. This prior art airflow path 30, as illustrated in FIG. 2, has little to no effect on the front coil area of the motor, resulting in uneven heat dissipation throughout the windings. Accordingly, the prior art airflow pattern enters the rear motor cover 11 and travels mainly between the inside of the motor cover walls and the outside of the motor housings 14 and 15. This prior art construction and its resultant airflow does not provide adequate and even cooling of the motor.

The inventive design, set forth in detail below, forces a greater amount of air to be drawn into the motor housing and flow in a path that contacts both the front and rear windings and provides more even cooling of both the front and rear windings and the stator.

SUMMARY OF THE INVENTION

In view of the shortcomings of the prior art, the present invention provides a method and apparatus for improved electric motor cooling.

It has now been found that an improved electric motor cooling construction is available wherein the motor housing and covers draw in more air and channel it into an air path that directly contacts the motor stator and coil windings to remove the heat and to more evenly cool the motor.

The improved electric motor comprises a first housing having a first wall defining a first interior space, and at least one opening disposed on a surface of the first housing; a second housing having a second wall defining a second interior space, and at least one opening disposed on a surface of the second housing; and a stator having a plurality of laminations a first portion of windings and a second portion of windings, the plurality of laminations disposed substantially within the first interior space and the second interior space, such that air flows i) into the at least one opening in the first housing, ii) over the first portion of windings, substantially all an exterior portion of the stator laminations, and the second portion of windings, and iii) out the at least one opening in the second housing.

According to another aspect of the invention, a front cover having openings is coupled to the surface of the second housing, and a rear cover having openings is coupled to the front cover and substantially surrounds the first and second housings. The openings in the rear cover are in fluid communication with the openings in first housing, and the openings in the front cover are adjacent and in fluid communication with the openings in the second housing.

According to a further aspect of the invention, the stator is substantially square.

According to yet a further aspect of the invention, the at least one opening in the first housing is a first plurality of openings and the at least one opening in the second housing is a second plurality of openings, at least a portion of the first plurality of openings and at least a portion of the second plurality of openings in respective planes substantially parallel to one another.

According to another aspect of the invention, the motor housings are in contact with the stator and have airflow channels therebetween.

According to yet another aspect of the invention, the stator is substantially round.

According to still another aspect of the invention, the front motor cover contacts the front motor housing to seal off airflow, forcing air through the motor.

According to yet a further aspect of the invention, the front and rear motor housings have a reduced gap therebetween so that airflow is inhibited from escaping from between the motor housings.

According to another aspect of the invention, the electric motor has a reduced operating temperature and a more even cooling of the stator windings and laminations.

These and other aspects of the invention are set forth below with reference to the drawings and the description of exemplary embodiments of the invention.

BRIEF DESCRIPTION OF THE DRAWINGS

The invention is best understood from the following detailed description when read in connection with the accompanying drawing. It is emphasized that, according to common practice, the various features of the drawing are not to scale. On the contrary, the dimensions of the various features are arbitrarily expanded or reduced for clarity. Included in the drawing are the following Figures:

FIG. 1 is an exploded perspective view of a prior art electric motor assembly;

FIG. 2 is a sectional view of the prior art motor assembly of FIG. 1;

FIG. 3B is a perspective view of an electric motor incorporating a second exemplary embodiment of the present invention;

FIG. 4 is a sectional view of the motor of FIGS. 3A and 3B;

FIG. 5 is a chart showing the performance characteristics of a prior art electric motor;

FIG. 6 is a chart showing the performance characteristics of an electric motor which incorporates an exemplary embodiment of the present invention, and;

It should, of course, be understood that the description and drawings herein are merely illustrative and that various modifications and changes can be made in the structures disclosed without departing from the spirit of the invention. Like numerals refer to like parts throughout the several views.

DETAILED DESCRIPTION

Figure 3A:
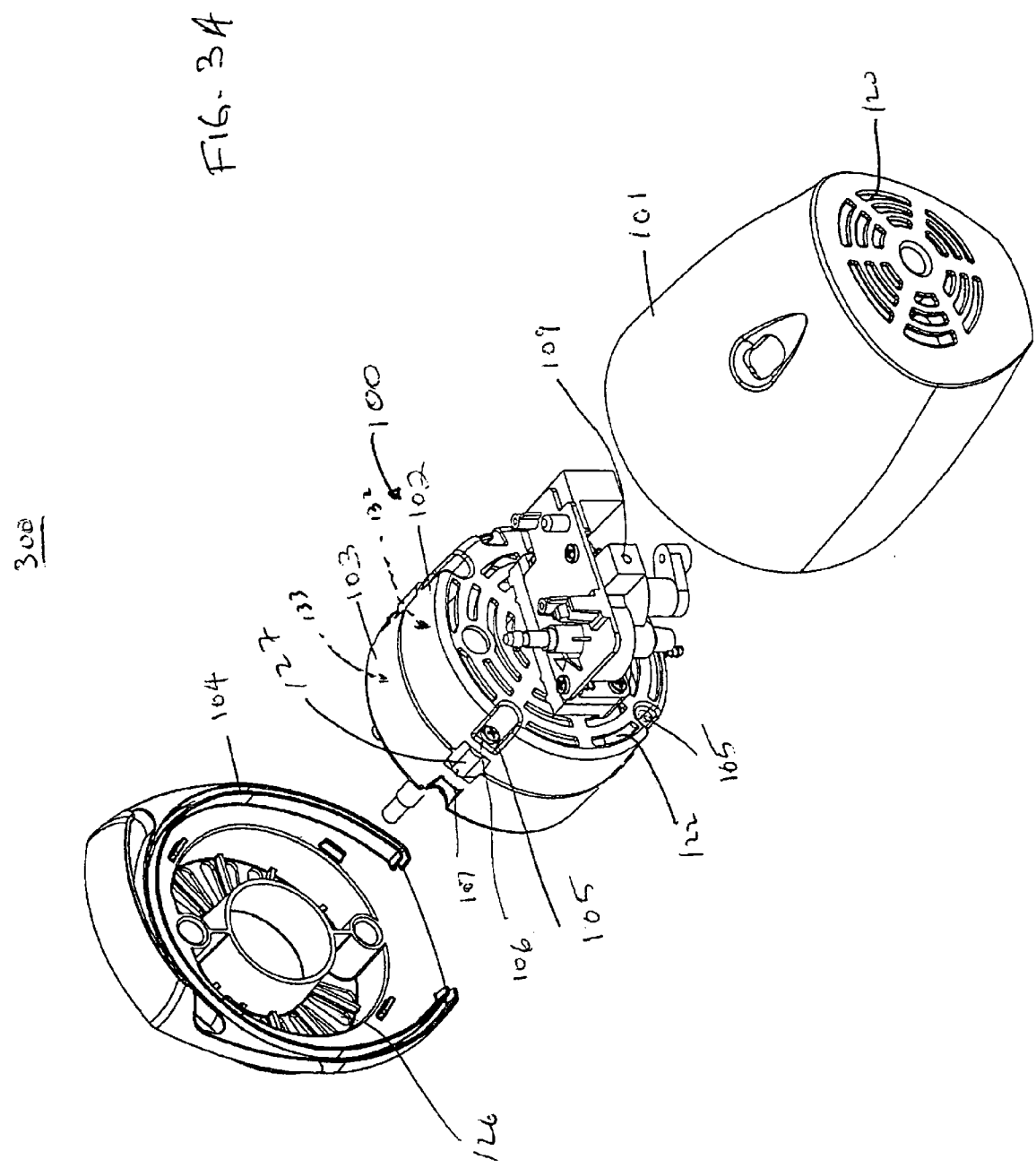
FIG. 3A is a perspective view of an electric motor incorporating a first exemplary embodiment of the present invention.

When referring to the preferred embodiment, certain terminology will be utilized for the sake of clarity. Use of such terminology is intended to encompass not only the described embodiment, but also technical equivalents which operate and function in substantially the same way to bring about the same result.

Referring now more particularly to the drawings and FIGS. 1 and 2 thereof, a prior art electric motor assembly 10 is therein illustrated.

As shown in FIG. 1, motor assembly 10 includes rear cover 11, front cover 12 of a generally circular configuration, with motor 50 contained therein.

Motor 50 includes front and rear motor housings 15 and 14, respectively, which are in contact with and are secured to the outside surfaces of motor stator 17, in a conventional manner, retaining it therebetween, such as by screws 18 extending into spaced bosses 20, on motor housings 14 and 15.

Motor stator 17 is of square configuration and extends outside motor housings 14 and 15.

Referring now to FIG. 2, motor assembly 10 is also provided with rotor (not shown) and output shaft 22, which has a hub 23 of fan blade assembly 24 secured thereto in a conventional well known manner. Motor stator 17 includes a plurality of laminated sheets of steel 25, with rear coil windings 26, and front coil windings 27, secured thereto in a well known manner.

Referring again to FIG. 2, the airflow pattern for cooling motor 50 is illustrated by curved lines 30, which show air entering through openings 31 in rear cover 11, over a motor capacitor 32, over the exterior of rear motor housing 14, over the exterior of front motor housing 15 and exiting through openings 35 in front cover 12 (best shown in FIG. 1).

As is clearly shown in FIG. 2, airflow 30 does not directly contact the laminated sheets 25, and the rear coil windings 26 and the front coil windings 27 to provide cooling. Rather, airflow 30 ineffectively attempts to draw heat away by contacting front motor housing 15 and rear motor housing 14.

Referring now more particularly to FIGS. 3A and 4, a fan motor assembly 300 incorporating a first exemplary embodiment of the present invention is shown. As shown in FIG. 3A, fan motor assembly 300 includes rear cover 101, rear motor housing 102, front cover 104, and motor 100. Each of front and rear motor housing 103, 102 have at least one respective opening (122 as shown in FIG. 3a for rear motor housing 102) therein to allow for the passage of air therein (explained in detail below with respect to FIG. 4). Opening 122 may be formed in a variety of shapes and orientations, such as slots formed circumferencially and/or radially, or circular openings, for example.

Motor 100 includes rear motor housing 102 and front motor housing 103 defining interior spaces 132 and 133, respectively. The front and rear motor housings 103 and 102 are fastened together by fasteners 105, such as screws, which may extend through bosses 106 in rear motor housing 102 into bosses 107 in front motor housing 103, securing the motor housings in fluid tight relation with one another. Motor housings 102 and 103 are preferably of cast or stamped metal such as aluminum, zinc or steel. Alternatively, either or both motor housings 102, 103 may be formed from a polymer, if desired.

Rear cover 101 is secured to the rear motor housing 102 by a fastener 108 (best shown in FIG. 4), such as a screw, engaged in boss 109 which is in turn coupled to housing 102. Front and rear motor covers 104 and 101 are preferably of metal or plastic.

Referring now to FIG. 4, motor stator 110 is provided, of a generally square configuration, with a plurality of laminated sheets of steel 111, with rear coil windings 112, and front coil windings 114 secured thereto in a well known manner. In this exemplary embodiment, motor stator 110 is contained substantially within interior spaces 132, 133 of motor housing 102 and 103, with only corners 127 of stator 110 extending beyond the confines of motor housing 102 and 103 (best shown in FIG. 3A). Motor 100 has a rotor 113, output shaft 134, and hub 115 of fan blade assembly 116 secured thereto.

Front cover 104 has inside and outside rims 117 and 118, which receive rear cover 101 therebetween, to couple front cover 104 to rear cover 101 and form a seal between front cover 104 and rear cover 101. As shown in FIG. 4, front cover 104 is in close contact with the front motor housing 103 and is attached thereto in a conventional manner, using screws, for example (not shown).

Figure 3D:
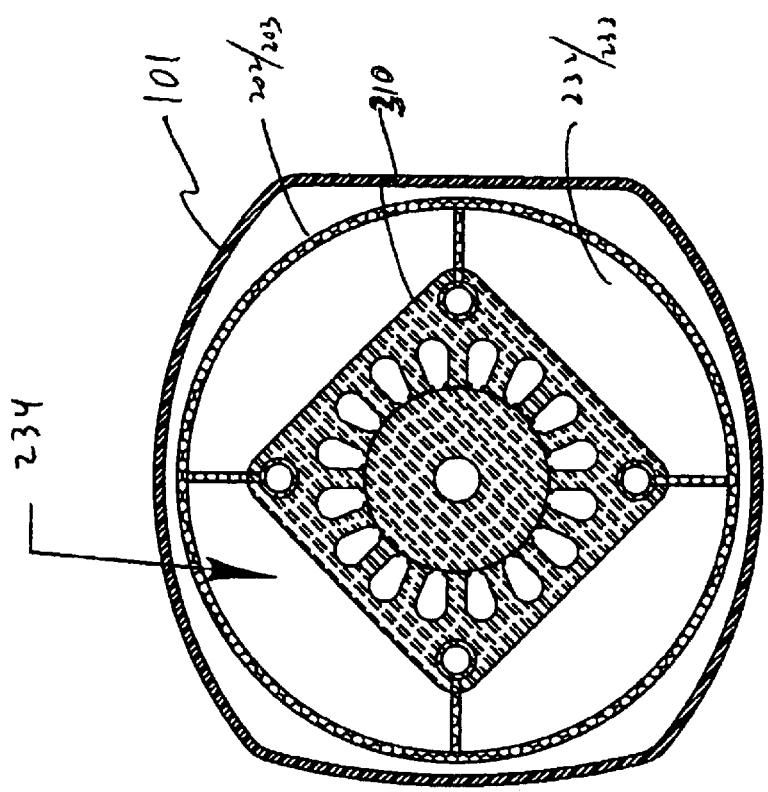
FIGS. 3C and 3D are sectional views illustrating details of the exemplary embodiment of FIG. 3B.
Figure 3C:
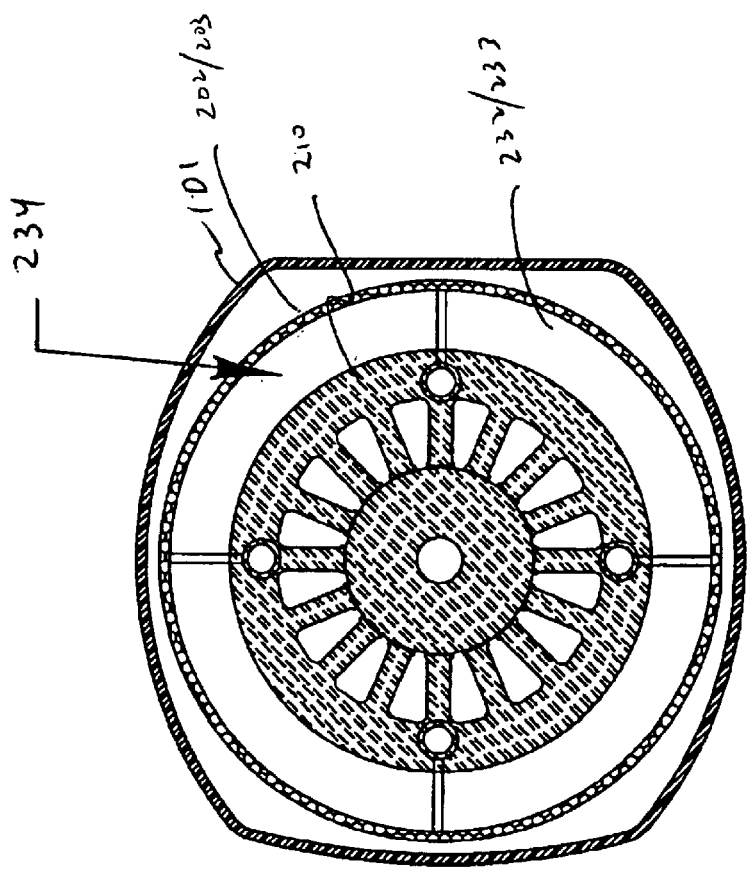

Referring now to FIG. 3B, fan motor 200 incorporating a second exemplary embodiment of the present invention is shown. As shown in FIG. 3B, the significant differences between the first and second exemplary embodiments is the containment of the entirety of stator 210 within interior 232, 233 of motor housings 202, 203, respectively, forming airflow cavity 234 between the inner walls of motor housings 202, 203 and stator 210. This is best illustrated in FIG. 3C. Similar to the first exemplary embodiment, the front and rear motor housings 203 and 202 are fastened together by fasteners 105, such as screws, which may extend through bosses 206 in rear motor housing 202 into bosses 207 in front motor housing 203, securing the motor housings in fluid tight relation with one another.

In one version of this exemplary embodiment, stator 210 is substantially round and attached to at least one of housings 202, 203 using conventional means, such as staking through the walls of either or both housings 202, 202, press fit within either or both housings 202, 202, or stops incorporated within interior spaces 132 and 133 of the motor housings, for example. Alternately, and as shown in FIG. 3D, stator 310 may be substantially square.

In an exemplary embodiment of the present invention, motor 100 may be a permanent split capacitor (PSC) motor having any of a variety of pole configurations, such as 4 poles and 6 poles. The invention is not so limited, however, and it is contemplated that motor 100 may be of other types, such as a shaded pole motor, for example.

As shown in FIG. 4, air, depicted by air flow lines 128, is drawn toward and enters motor 100 by action of fan blade 116, through openings 120 in rear cover 101, and through openings 122 in rear motor housing 102, over and in contact with rear coil windings 112, the exterior portions of laminated sheets 111, front coil windings 114, exiting through openings 125 in front housing 103, and finally out the front cover 104 through openings 126, thereby drawing heat out of fan motor 100. This improved airflow is substantially identical in each of the two exemplary embodiment described above.

Referring now to FIG. 5, a fan motor, such as motor 50 was tested for efficiency and measured temperature. As shown in FIG. 5, at column 502, the heat distribution with a conventional cooling construction was very uneven, with an 11.3° C. differential between front coils 27 and rear coils 26.

Figure 7:
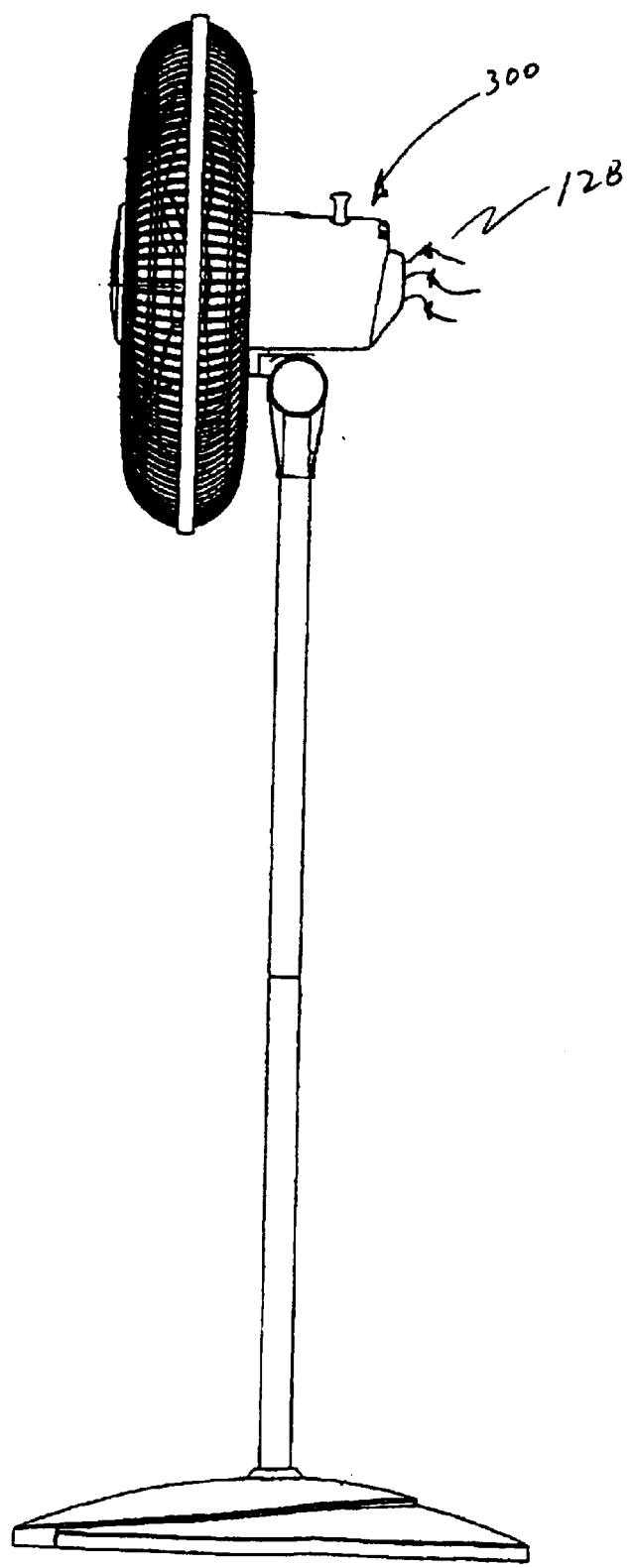
FIG. 7 is an illustration of an oscillating fan incorporating an exemplary embodiment of the present invention.

In FIG. 6, motor 100 was tested where the only difference between motor 100 and motor 10 was the improved cooling provided by motor housings 102, 103, front cover 104 and rear cover 101. As shown in FIG. 6, at column 602, the temperatures of the front and rear coil windings 114 and 112 were the same and were significantly lower than the temperatures recorded for motor 10 by greater than 19° C. for the rear coils and by greater than 30° C. for the front coils. As shown in FIG. 7, it is contemplated that this improved motor assembly 300 may be used in an oscillating fan 700, for example.

Although the invention has been described with reference to exemplary embodiments, it is not limited thereto. Rather, the appended claims should be construed to include other variants and embodiments of the invention, which may be made by those skilled in the art without departing from the true spirit and scope of the present invention.

What is claimed is:

1. An electric motor comprising:
   a first housing having:
      i) a first wall defining a first interior space, and
      ii) at least one opening disposed on a surface of the first housing;
   a second housing having:
      i) a second wall defining a second interior space, and
      ii) at least one opening disposed on a surface of the second housing; and
   a stator having a plurality of laminations, a first portion of windings and a second portion of windings, the plurality of laminations disposed substantially within at least one of the first interior space and the second interior space,
   wherein air flows i) into the at least one opening in the first housing, ii) over the first portion of windings, substantially all of an exterior portion of the plurality of stator laminations, and the second portion of windings, and iii) out the at least one opening in the second housing,
   and wherein the electric motor is a permanent split capacitor motor.

2. An electric motor comprising:
   a first housing having:
      i) a first wall defining a first interior space, and
      ii) at least one opening disposed on a surface of the first housing;
   a second housing having:
      i) a second wall defining a second interior space, and
      ii) at least one opening disposed on a surface of the second housing;
   a stator having a plurality of laminations, a first portion of windings and a second portion of windings, the plurality of laminations disposed substantially within at least one of the first interior space and the second interior space; and
   a motor cover substantially enclosing the first and second housings therein, the motor cover including:
      i) a first cover coupled to the second housing, the first cover having at least one opening in a surface thereof, the at least one opening adjacent and in fluid communication with the at least one opening in the second housing, and
      ii) a second cover coupled to the first cover and substantially surrounding the first and second housings, the second cover having at least one opening in a surface thereof, the at least one opening adjacent and in fluid communication with the at least one opening in the first housing,
   wherein air flows i) into the at least one opening in the first housing, ii) over the first portion of windings, substantially all of an exterior portion of the plurality of stator laminations, and the second portion of windings, and iii) out the at least one opening in the second housing.

3. An electric motor according to claim 2, wherein the first and second covers are formed from at least one of a metal and a polymer.

4. An electric motor according to claim 2, wherein the second cover is coupled to a portion of the first housing.

5. An electric motor according to claim 2, further comprising means for sealing the first cover to the second cover.

6. An electric motor according to claim 1, wherein the first and second housings are formed from a metal.

7. An electric motor according to claim 1, wherein the stator is one of substantially square and substantially round.

8. An electric motor according to claim 1, wherein an end portion of the stator is coupled to at least one of the first and second housings.

9. An electric motor according to claim 1, wherein the at least one opening in the first housing and the at least one opening in the second housing are in respective planes that are substantially parallel to one another.

10. An electric motor according to claim 2, wherein the motor is a permanent split capacitor motor.

11. An electric motor according to claim 2, wherein the motor is a shaded pole motor.

12. An oscillating fan incorporating the electric motor according to claim 1.

13. An electric motor comprising:
- a first housing having:
  - i) a first wall defining a first interior space, and
  - ii) a first plurality of openings disposed on a surface of the first housing;
- a second housing having:
  - i) a second wall defining a second interior space, and
  - ii) a second plurality of openings disposed on a surface of the second housing;
- a stator having a plurality of laminations, a first portion of windings and a second potion of windings, the stator disposed within at least one of the first interior space and the second interior space,
- wherein air flows i) into at least a portion of the first plurality of openings, ii) over the first portion of windings, an exterior portion of the stator laminations, and the second portion of windings, and iii) out at least a portion of the second plurality of openings,
- and wherein the electric motor is a permanent split capacitor motor.

14. An electric motor according to claim 13, wherein the stator is one of substantially square and substantially round.

15. An electric motor comprising:
- rotor means;
- stator means for providing an electro-magnetic force to the rotor means;
- housing means for housing therein at least a substantial portion of the stator means; and
- ventilation means for providing airflow i) into the housing means, ii) over at least substantially all of an exterior portion the stator means, and iii) out of the housing means,
- wherein the motor is a permanent split capacitor motor.

16. An electric motor comprising:
- rotor means;
- stator means for providing an electro-magnetic force to the rotor means;
- housing means for housing therein at least a substantial portion of the stator means;
- ventilation means for providing airflow i) into the housing means, ii) over at least substantially all of an exterior portion the stator means, and iii) out of the housing means;
- cover means for covering the housing means; and
- sealing means for forming a seal in the cover means,
- wherein the airflow passes into a first portion of the cover means, through the housing means and out a second portion of the cover means.

17. An electric motor according to claim 16, wherein the motor is a permanent split capacitor motor.

18. An electric motor assembly having a rear cover, a front cover attached to the rear cover, front and rear motor housings inside the front and rear covers and secured together in fluid tight relation, a motor stator substantially contained within the front and rear housings, a rotor in the motor stator and having an output shaft with a fan blade assembly thereon which draws air through the motor assembly, the improvement which comprises:
- the rear cover having at least one opening for air to flow therethrough,
- the rear housing having at least one opening therein for air to flow thereinto,
- the front housing having at least one opening therein for air to flow thereout, the front and the rear housing secured together,
- the motor stator is in close contact with the motor housings, such that air flowing therethrough is in direct contact with substantially all of an exterior portion of the stator,
- the front cover having at least one opening for air to flow thereout, and the front housing in fluid tight relation with the front cover to force air to flow through the at least one opening in the front housing and out at least one opening in the front cover,
- wherein the electric motor is a permanent split capacitor motor.

19. An oscillating fan comprising:
an electric motor including:
i) a first housing having:
  (a) a first wall defining a first interior space, and
  (b) a first plurality of openings disposed on a surface of the first housing;
ii) a second housing having:
  (a) a second wall defining a second interior space, and
  (b) a second plurality of openings disposed on a surface of the second housing; and
iii) a stator having a plurality of laminations, a first portion of windings and a second portion of windings, the plurality of laminations disposed substantially within at least one of the first interior space and the second interior space, and
a motor cover substantially enclosing the first and second housings therein, the motor cover including:
i) a first cover coupled to the second housing, the first cover having a third plurality of openings in a surface thereof, at least a portion of the third plurality of openings adjacent and in fluid communication with at least a portion of the second plurality of openings, and
ii) a second cover coupled to the first cover and substantially surrounding the first and second housings, the second cover having a fourth plurality of openings in a surface thereof, at least a portion of the fourth plurality of openings adjacent and in fluid communication with at least a portion of the first plurality of openings,
wherein air flows i) into at least a portion of the fourth plurality of openings ii) through at least a portion of the first plurality of openings, iii) over the first portion of windings, substantially all of an exterior portion of the stator laminations, and the second portion of windings, iv) through at least a portion of the second plurality of openings, and v) out at least a portion of the third plurality of openings.

\* \* \* \* \*